Dec. 19, 1967   H. CLEMENTS   3,359,014
PIPE COUPLINGS
Filed April 14, 1966

INVENTOR
HENRY CLEMENTS
By Linton and Linton
ATTORNEYS

United States Patent Office 3,359,014
Patented Dec. 19, 1967

3,359,014
PIPE COUPLINGS
Henry Clements, Leatherhead, England, assignor to Andre Rubber Company Limited, Surbiton, Surrey, England
Filed Apr. 14, 1966, Ser. No. 542,581
Claims priority, application Great Britain, Apr. 15, 1965, 16,236/65
5 Claims. (Cl. 285—55)

ABSTRACT OF THE DISCLOSURE

The present flexible coupling is for use in liquid piped systems to absorb and dissipate pressure fluctuations in the liquid passing therethrough. The coupling includes two rigid end members each having a flange portion and a tube portion whose axis is perpendicular to said flange portion, a flexible tube having an enlarged bead at each end secured to the end members by retaining the beads between the tubular portion and an internal tube with outwardly extending ends.

Background of the invention

Figure 1:
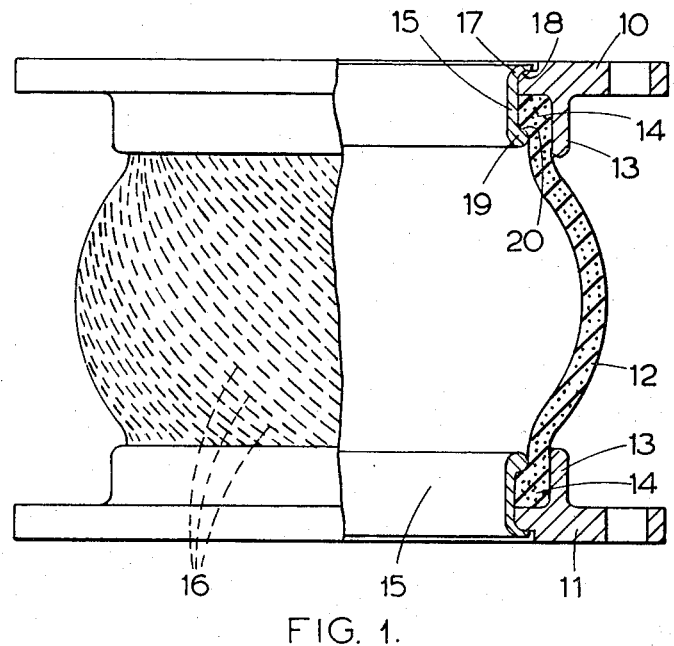

There is a requirement for a pipe coupling in liquid conveying systems, such as central heating systems, which will minimise the transmission of noise through the piping and will absorb the shock load of high instantaneous pressures caused, for example, by hammer blow.

In a central heating system supplying a large building the hot water will be pumped round the system by a pump driven, for example, by an electric motor. The metallic pipes of the system form an excellent transmission medium for any running noise produced by the pump and its electric motor. Such noise may be unacceptable in apartment buildings or even in offices where quiet working conditions are required and it is therefore necessary to isolate as far as possible the noise source from the remainder of the pipework of the system. This can be done by inserting a flexible coupling on each side of the pump.

There is also a requirement in liquid transmission systems for a flexible coupling which will be able to absorb high instantaneous pressures due, for example, to hammer blows. In a tall building the supply of water to the main storage tank, which may be positioned on the top floor of the building, is carried through a pipe which extends the full height of the building. The entry of the water into the water storage tank is controlled by an electromagnetic solenoid operated valve which is usually a simple on/off valve. Thus when the water in the tank falls below a predetermined minimum level the valve opens allowing the tank to fill up and when the water reaches a predetermined maximum level the valve shuts off. It is the action of shutting off, which is very rapid, which causes hammer in the supply pipe. Pressures may be developed in the pipe which are ten times the normal working pressure if no arrangement is made for dissipating the kinetic energy in the moving column of water and often a burst will be caused. A flexible coupling can be installed for this purpose and this coupling expands when the pressure increases thus allowing the energy to dissipate against this expansion.

A flexible coupling should preferably be made in a single unit and to facilitate easy assembly the coupling should not have any loose or detachable parts, such as flanges.

Object of the invention

It is an object of the invention to provide a flexible coupling which will act as a sound absorbing arrangement. It is a further object of the invention to provide a coupling which will be capable of absorbing large amounts of kinetic energy so as to prevent high instantaneous pressures developing.

Summary of the invention

According to the invention there is provided a pipe coupling comprising rigid end flanges and a central flexible section formed of an elastomeric material and having an enlarged annular retaining bead at each end thereof, each bead being retained between an annular rim of the respective flange and a tube, the annular rim and/or the corresponding end of the tube having been radially rolled towards each other and the other end of said tube having been radially rolled towards the flange whereby to retain it with respect to said flange.

Preferably, the elastomeric material is reinforced with a "weftless" fabric, such as the material known as tyre cord, which extends throughout the central section. Preferably also the central section is encircled by a band of metallic material located between annular shoulders of the central section and arranged to give mechanical support to the central section against excessive deflection.

In the case where the central section is required to be fitted into a liquid system for conveying liquids which are corrosive, the whole of the inside of the pipe coupling is lined with a protective liner.

A feature of the invention is the provision of a method of assembling a pipe coupling comprising the steps of locating a flexible section which is formed of an elastomeric material and which has an enlarged annular bead at each end thereof with each bead between an annular rim of a rigid end flange and a tube and radially rolling the annular rim and/or the corresponding end of the tube so as to compress the bead of the central section and radially rolling the other end of the tube to force said other end of the tube against the respective flange whereby to retain said tube with respect to the flange.

Description

Figure 2:
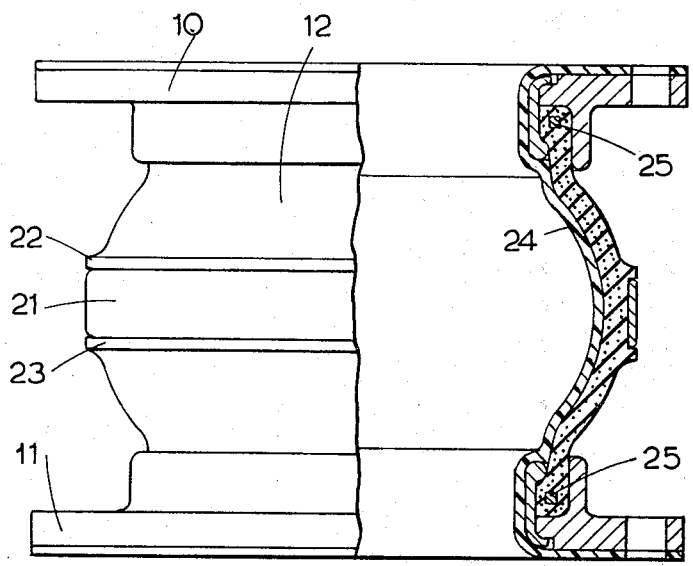

Features and advantages of the present invention will be apparent from the following description of various embodiments, given by way of example only, with reference to the accompanying drawings, in which, FIGURE 1 is an elevation partly in section of a pipe coupling constructed in accordance with the invention, and, FIGURE 2 is a similar view of a different embodiment of the invention.

The pipe coupling shown in the drawings has two end flanges 10 and 11 and a central section 12. The flanges 10, 11 are provided with bolt holes for attachment to the flanges of adjacent pipe sections, the number and size of such bolt holes depending upon the pipe size.

The central section locates at each end within an annular rim 13 integrally formed on each flange. Each end of the central section terminates in an enlarged bead 14 and each bead is firmly clamped between the respective rim 13 and a respective short length of tube 15.

Between the beads 14 the central section is everted, that is it is internally concave in the longitudinal cross-section containing the axis of the coupling. The central section is formed of an elastomeric material reinforced by a "weftless" woven fabric. A "weftless" woven fabric is a material having a very strong warp and a very weak weft, the weft merely providing sufficient mechanical strength to position the warp during incorporation of the "weftless" fabric in the article during manufacture; the weft is not strong enough to provide any usable mechanical strength under load. A material of this kind is used in the production of pneumatic tyres and is called tyre cord. One or more layers of "weftless" fabric may be incorporated in the central section and in the coupling shown in FIGURE 1 two such layers are included. In this coupling, as shown in the lower half of FIGURE 1, the "weftless" fabric is arranged on the bias with the warp extending at approximately 45° to the longitudinal axis of the coupling. In FIGURE 1, the top layer of warp is indicated at 16 and it is to be noted (although this is not obvious from the drawing) that the second layer is also arranged on the bias but in the opposite direction to the top layer, that is at approximately 45° in the opposite direction.

In alternative arrangements, the warp of the reinforcing material does not necessarily lie of the bias and may extend longitudinally, that is parallel to the longitudinal axis of the coupling, or circumferentially around the coupling or at any angle in between and different layers may be arranged to extend in different directions so as to obtain any required deflection characteristic for the central section.

The reinforcement extends into the beads 14 of the central section and is suitably folded and doubled to ensure positive retention therein.

In the manufacture of the coupling the central section is formed as a single bonded unit and assembly is carried out by inserting the each bead 14 of the central section into the recess formed within the annular rim 13 of each flange. With the bead in position the tube 15, which is initially a straight length of tube, is slid inside the flange and bead and rolling operation is then performed. One end 17 of the tube 15 is rolled radially outwardly so as to mate firmly with a radiussed edge 18 on the flange. The other end 19 of the tube 15 is rolled radially outwardly behind a shoulder 20 on the bead. At the same time the annular rim 13 is rolled slightly inwards. The amount by which this rim is deflected is very small and is insufficient to be seen in the drawing but it is just enough to provide a very strong compressing action in conjunction with the outwardly rolled end 19 of the tube 15 to retain the central section. It will be seen that the rolled portion of the end 17 on the tube prevents movement of the tube in the longitudinal direction towards the centre of the coupling and the rolled portion of the end 19 of the tube forms an annular projection which compresses the central section against the rim 13 and which resists movement of the central section inwardly towards the centre of the coupling. Thus when the central section is deflected radially outwardly by internal pressure the beads of the central section are firmly held and the longitudinal components of the forces developed in the central section are transmitted to the adjacent pipe lengths through the flanges.

The coupling shown in FIGURE 2 is substantially the same as the coupling in FIGURE 1 and has a few minor modifications. The central section is reinforced by a metal band 21 which locates between two annular shoulders 22, 23 integrally formed on the central section. The provision of this band limits the radially outward deflection of the centre of the central section so that substantial deflection can only take place in those portions of the central section between the beads 14 and the band 21 either side of the band 21. The deflection characteristic of the coupling is thus altered. Also, in FIGURE 2 a plastic liner 24 has been provided and this is separately moulded and inserted after assembly of the coupling. The liner is required when it is necessary to transmit through the coupling liquids which are highly corrosive or liquids which have a deleterious effect on any of the material of the coupling. The liner is made of a material selected not to react to the liquid being transmitted. The liner does not provide any additional mechanical strength but it must be sufficiently flexible to follow the deflection of the central section when this is deflected under high instantaneous pressure. In FIGURE 2 the beads 14 are each additionally reinforced by a hoop 25 around which the "weftless" material may be wrapped. The coupling is a single unit with its flanges permanently secured to the central section and this facilitates assembly and the coupling can easily be inserted between the flanges of the pipework in which it is required.

While in the particular construction described above with reference to the accompanying drawings, the bead is trapped between the annular rim and the tube solely by radially rolling the tube, it will be appreciated that the present invention includes trapping the bead by rolling the annular rim radially towards the tube or alternatively radially rolling bith the annular rim and the end of the tube towards each other. It will also be appreciated that the shape of the bead in cross-section may be advantageously modified so as to extend outwardly where the annular rim is to be rolled inwardly to trap the bead.

I claim:
1. A pipe coupling comprising rigid end members each having flange portion and a tube portion whose axis is perpendicular to said flange portion, rigid tubes, and a central flexible section formed of an elastomeric material and having an enlarged retaining bead at each end thereof, each of said beads being retained between the inner surface of said tube portion of one of said end members and the outer surface of one of said rigid tubes which is positioned with its axis coinciding with the axis of said tube portion, both ends of each of said tubes having a belled-out shape whereby to retain the tube with respect to the flange portion of one of said end members and to retain the neck of one of said beads between one end of said tube and the annular rim of the tube portion of said end member.

2. A pipe coupling according to claim 1 wherein a weftless fabric which is arranged on the bias with respect to the axis of the coupling reinforces said elastomeric material.

3. A pipe coupling according to claim 1 wherein a metal band encircles said central flexible section and is arranged to give mechanical support to the central section against excessive deflection.

4. A pipe coupling according to claim 1 wherein a protective liner lines the whole of the inside of the pipe coupling.

5. A pipe coupling comprising rigid end members each having a flange portion and a tube portion, rigid tubes, and a central flexible section formed of elastomeric material and having an enlarged retaining bead at each end thereof, each of said beads being retained between the inner surface of the tube portion of one of said end members and the outer surface of one of said rigid tubes positioned internally of said bead with its axis coinciding with the axis of said tube portion both ends of each of said tubes having a radially outwardly extending portion, the free end of the tube portion of each of said end members extending inwardly whereby to retain one of said tubes with respect to the flange portion of the end member and retaining the neck of one of said beads between the annular rim of said tube portion and one end of said tube.

References Cited

UNITED STATES PATENTS

| | | | |
|---|---|---|---|
| 2,338,666 | 1/1944 | Nelson | 285—258 X |
| 2,631,047 | 3/1953 | Spender et al. | 285—258 X |
| 2,879,804 | 3/1959 | Hammond | 285—229 X |
| 3,087,745 | 4/1963 | Rumbell | 285—226 X |
| 3,099,084 | 7/1963 | Thuiller | 29—512 X |
| 3,164,401 | 1/1965 | Fawkes | 285—229 |

FOREIGN PATENTS

| | | |
|---|---|---|
| 255,125 | 10/1964 | Australia. |
| 865,244 | 2/1953 | Germany. |
| 1,158,776 | 12/1963 | Germany. |

CARL W. TOMLIN, *Primary Examiner.*

T. F. CALLAGHAN, *Examiner.*